(12) United States Patent
Lior et al.

(10) Patent No.: US 6,295,802 B1
(45) Date of Patent: Oct. 2, 2001

(54) ORBITING ENGINE

(75) Inventors: David Lior, 1 Mohliver Street, Herzlia 46328; Yeshayahu Levy, Haifa, both of (IL)

(73) Assignee: David Lior, Herzelia (IL)

( * ) Notice: Subject to any disclaimer, the term of this patent is extended or adjusted under 35 U.S.C. 154(b) by 0 days.

(21) Appl. No.: 09/269,638

(22) PCT Filed: Sep. 29, 1997

(86) PCT No.: PCT/IB97/01462

§ 371 Date: Mar. 31, 1999

§ 102(e) Date: Mar. 31, 1999

(87) PCT Pub. No.: WO98/16722

PCT Pub. Date: Apr. 23, 1998

(30) Foreign Application Priority Data

Oct. 1, 1996 (IT) ....................................... 119335

(51) Int. Cl.[7] .................................................. F02C 3/16
(52) U.S. Cl. .................................................. 60/39.35
(58) Field of Search ........................... 60/39.35, 39.34; 415/80, 81, 82

(56) References Cited

U.S. PATENT DOCUMENTS

| | | | | |
|---|---|---|---|---|
| 2,465,856 | * | 3/1949 | Emigh | 60/39.35 |
| 2,499,863 | * | 3/1950 | Hart | 60/39.35 |
| 2,594,629 | * | 4/1952 | Exner | 60/35.6 |
| 3,200,588 | * | 8/1965 | Math | 60/39.35 |
| 3,557,551 | * | 1/1971 | Campbell | 60/39.16 |
| 3,699,771 | * | 10/1972 | Chelminski | 60/39.35 |

FOREIGN PATENT DOCUMENTS 61-16252 * 1/1986 (JP) ..................................... 60/39.35

* cited by examiner

Primary Examiner—Louis J. Casaregola
(74) Attorney, Agent, or Firm—Mark M. Freidman

(57) ABSTRACT

An orbiting engine includes a plurality of combustion chambers (52) rigidly connected to and disposed equidistantly from a central shaft (54). The combustion chambers (52) are oriented so that exhaust gases emerge therefrom tangentially to a circle concentric with the shaft (54), thereby causing the shaft to rotate. In preferred embodiments, a centrifugal compressor (62), radially inward from the combustion chambers (52) and driven by the shaft (54), compresses air that serves to oxidize fuel injected into the combustion chambers (52).

5 Claims, 6 Drawing Sheets

ORBITING ENGINE

CROSS REFERENCE TO RELATED APPLICATIONS

This application is a 371 of PCT/IB97/01462 filed on Sep. 29, 1997

FIELD AND BACKGROUND

The present invention relates to rotary engines, and more particularly, to an engine whose power is provided by rocket motors orbiting a central power shaft.

Through the Twentieth Century, the efficiencies and power to weight ratios of engines have improved steadily. Modern powerful aerospace gas turbine engines attain thermal efficiencies of 35% and a power to weight ratio of 3 to 4 kW per kg at a cost of $250 per kg. This high cost excludes these engines from the low power (under 500 kW) aircraft vehicular and industrial applications. For example, small airplanes and helicopters are powered only by prison engines to this day. The main factor contributing to this high cost is the complexity of a rotating turbine operating at high speed and high temperature. The main factor contributing to the low efficiency of low power turbine engines is the small dimension of the rotating compressors and turbines.

A major limitation of a rotating turbine is the creep characteristics of the turbine blade material. At present, the temperature limit at the turbine inlet of a gas turbine engine is 1500° C. because of creep, although the combustion temperature is much higher (around 2500° C.). This prevents turbine engines, especially small turbine engines, from approaching their theoretical thermodynamic efficiencies.

Thus, there is a widely recognized need for, and it would be highly advantageous to have, a low power rotary engine that would overcome these disadvantages of present known turbine engines.

SUMMARY OF THE INVENTION

According to the present invention there is provided an engine for driving a load shaft, comprising: (a) a power shaft; and (b) a plurality of combustion chambers, each of the chambers being substantially equidistant from the power shaft and rigidly connected to the power shaft, each of the chambers being provided with a nozzle oriented so that exhaust gases exit the chamber therethrough in a direction substantially tangential to a circle concentric with the power shaft.

The earliest known reaction motor is the device shown in FIG. 1, invented more than 2000 years ago by Hero of Alexandria for sprinkling water of purification on worshippers in a pagan temple. A spherical boiler 10 is provided with two tangential nozzles 12 at opposite sides of boiler 10 and pointing in opposite directions. Boiler 10 is mounted on a stand 16 so that boiler 10 is free to rotate about an axis perpendicular to the plane defined by nozzles 12. Boiler 10 is partially filled with water and fire 18 is placed under boiler 10 to boil the water. Water and steam 14 emerging from nozzles 12 causes boiler 10 to rotate. Hero's device was intended to provide a spray of water, not to provide power. An ordinary garden water sprinkler functions similarly, also to provide a spray of water rather than providing power. The device of the present invention uses reaction motors, disposed circumferentially like nozzles 12 of Hero's device, to provide power to a central shaft.

About fifty year ago, a system similar to Hero's was tried for helicopter propulsion. In this system, hot gases were forced radially through the blades of the helicopter and exhausted circumferentially from the blade tips. The idea was to rotate the blades using the reaction force of the circumferentially exhausted gas. This system was unable to give sufficient propulsive power at a reasonable efficiency, because the blades could not withstand the high temperature of the hot gases needed for the desired performance. That system differs from the present invention in that that system uses hot gases generated elsewhere to drive the rotation of the blades, whereas the present invention drives a central shaft using reaction motors deployed around a circle concentric with the central shaft.

FIG. 2 shows the conceptually simplest, albeit least preferred, embodiment of the present invention. Two reaction motors, shown in FIG. 2 as solid fuel rocket motors 10, are connected rigidly by struts 22 to a power shaft 24. Rocket motors 20 are on opposite sides of shaft 24, and point in opposite directions. As is well known in the art, the bodies of rocket motor 20 serve as combustion chambers 26 for the solid fuel (actually a fuel-oxidizer mixture) contained therein. The exhaust gases produced by burning the solid fuel exit combustion chambers 26 via nozzles 28. All four struts 22 are of equal length, so that the exhaust gases emerge from nozzles 28 in opposite directions substantially tangent to a circle 30 concentric with shaft 24. Shaft 24 is supported by bearings (not shown) that allow shaft 24 to rotate about the longitudinal axis thereof, but allow no other motion, so that the reactive forces associated with the emergence of exhaust gases from nozzles 28 apply a torque to shaft 24, causing shaft 24 to rotate about the longitudinal axis thereof.

The embodiment of FIG. 2 illustrates the principle of the present invention, but suffers from several practical deficiencies. The embodiment of FIG. 2 operates only as long as the solid fuel in rocket motors 20 lasts. Furthermore, it is difficult if not impossible to regulate the power output from this embodiment. Therefore, preferred embodiments of the device of the present invention provide continuous, easily regulated flows of fluid fuel and oxidizer to circumferentially mounted combustion chambers. The preferred oxidizer is air, compressed by one or more centrifugal compressors coaxial with shaft 24 and driven by shaft 24.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of an engine in which power is supplied to a central shaft by circumferentially mounted reaction motors.

The principles and operation of an orbiting engine according to the present invention may be better understood with reference to the drawings and the accompanying description.

Figure 1:
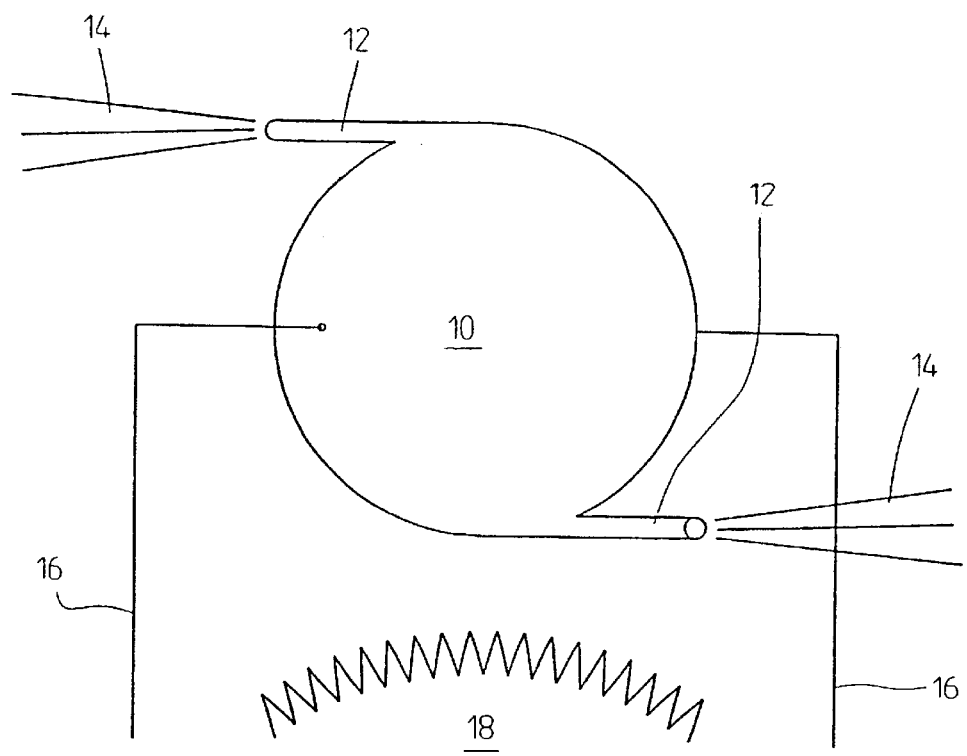
FIG. 1 (prior art) is a schematic perspective view of the reaction motor of Hero of Alexandria.
Figure 2:
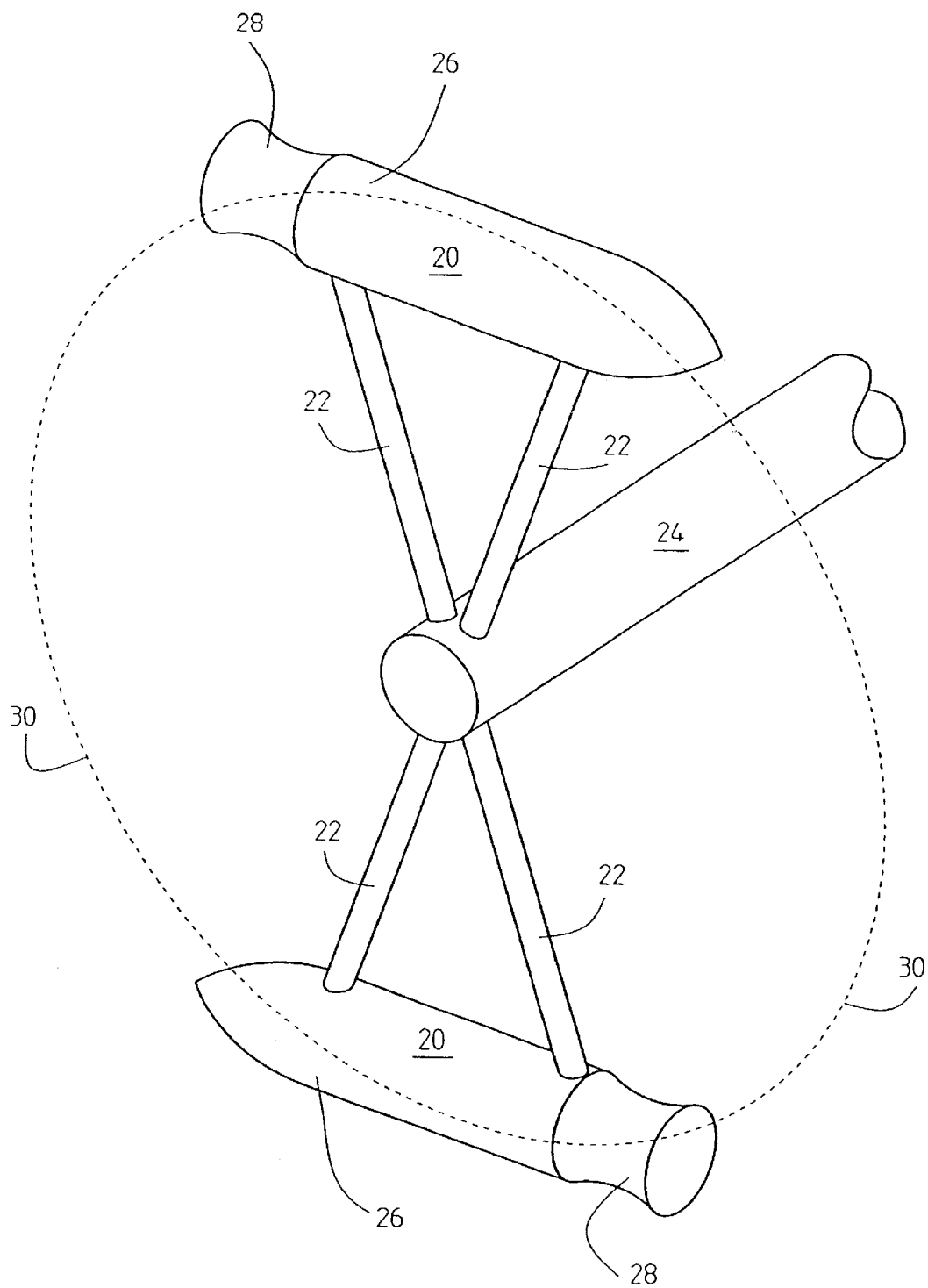
FIG. 2 is a schematic perspective view of the simplest embodiment of the present invention.
Figure 3:
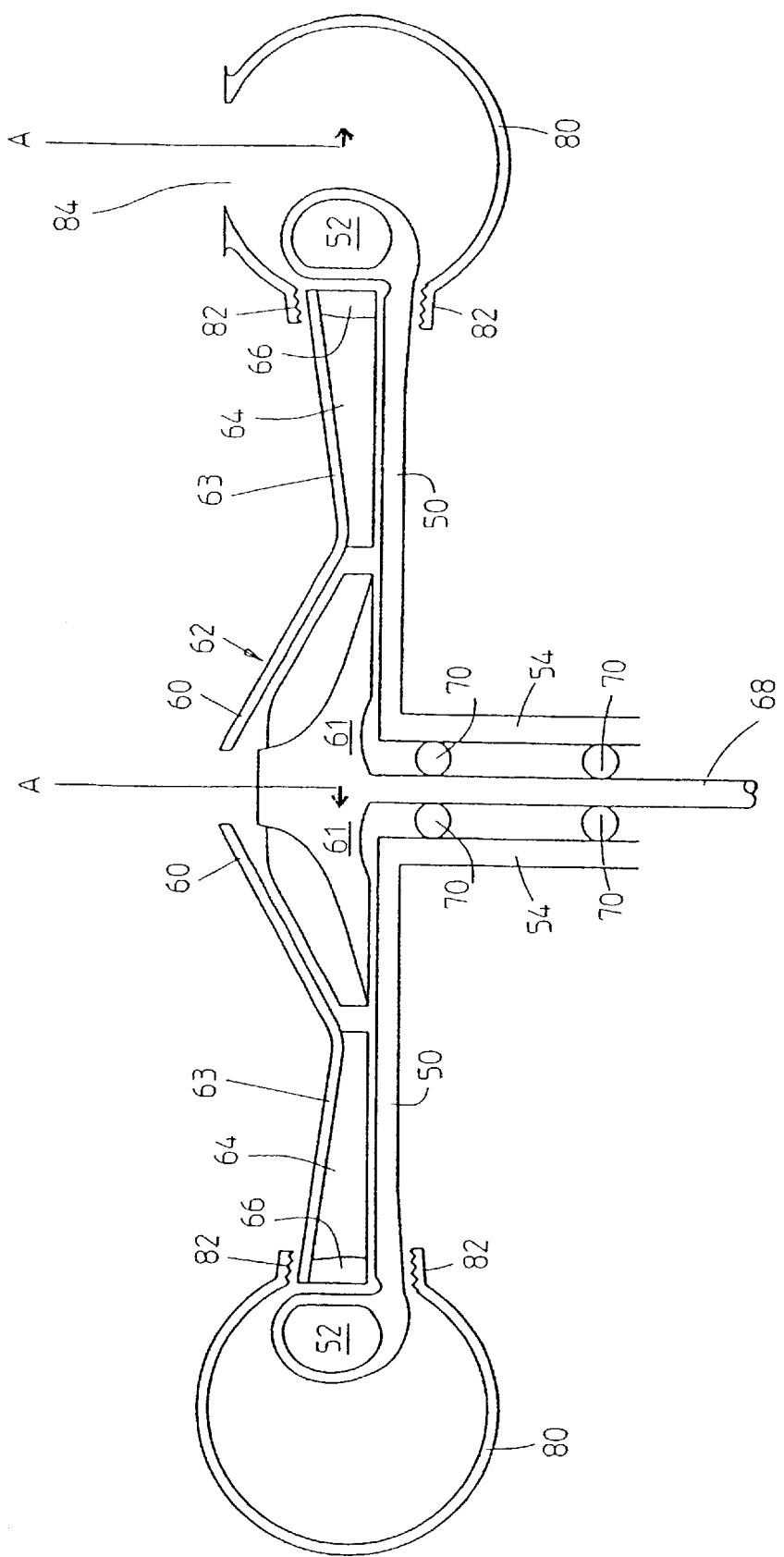
FIG. 3 is a schematic axial cross-sectional view of a preferred embodiment of the present invention.

Referring now to the drawings, FIG. 3 is a schematic axial cross-section of a preferred embodiment of the present invention. A circular disk 50 is mounted on a hollow power shaft 54. Around the circumference of disk 50 are mounted combustion chambers 52. Through hollow shaft 54 runs a compressor shaft 68. Compressor shaft 68 terminates in several compressor blades 61. Compressor shaft 68 is supported within hollow shaft 54 and within a compressor housing 60 by several bearings 70. Bearings 70 allow shaft 68 to turn freely about the longitudinal axis thereof within hollow shaft 54. Compressor blades 61 together with compressor housing 60 constitute a centrifugal compressor rotor 62. A radial extension 63 of compressor housing 60 defines a diffuser 64 between radial extension 63 and disk 50. Diffuser 64 is terminated by a circumferential array of vanes 66 around the periphery thereof.

Figure 4:
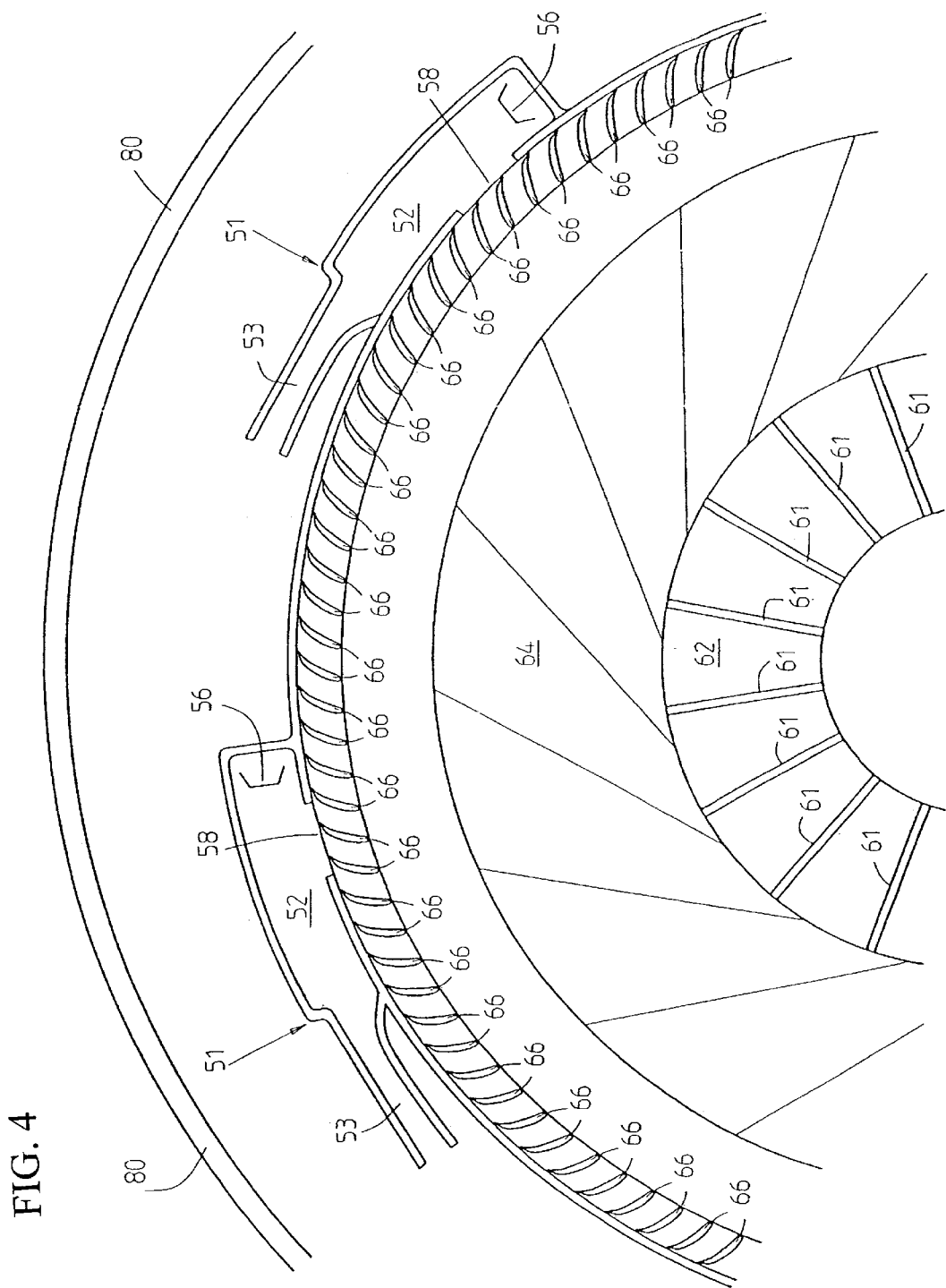
FIG. 4 is a close-up schematic view of cut A—A of FIG. 3.

FIG. 4 is a partial schematic cross-sectional view of the preferred embodiment of FIG. 3 along the section A—A. In FIG. 4 are shown two combustion chambers 52. Combustion chambers 52 are provided with fuel injectors 56, with longitudinal slits 58 and with nozzles 53. Nozzles 53 point substantially tangentially to the circle defined by the outer rim of disk 5. Together, combustion chambers 52 and nozzles 53 constitute reaction motors 51.

In operation, ambient air is sucked in and pressurized by compressor rotor 62 and further pressurized by diffuser 64. Compressor rotor 62 is designed for an optimal pressure ratio, typically between about 10:1 and about 15:1. The flow of air out of compressor rotor 62 is matched to the power requirements of the engine: roughly 1 kg/sec for 250 sec kW output. Exiting diffuser 64, the air expands past vanes 66 and enters combustion chambers 52 via slits 58. Fuel is impelled by centrifugal force via conduits (not shown) in disk 50 to fuel injectors 56. The compressed air and the fuel are mixed and ignited in combustion chambers 52, forming a hot exhaust gas that expands through nozzles 53. The reaction force thus generated turns disk 50 and hollow shaft 54 about the longitudinal axis of hollow shaft 54. Thus, reaction motors 51 travel in a circular orbit about the common longitudinal axis of shafts 54 and 68; hence the name "orbiting engine" for the present invention. The flow of fuel into combustion chambers 52 via fuel injectors 56 is controlled by conventional means to be proportional to the amount of compressed air entering combustion chambers 52 via slits 58, thereby regulating the combustion temperature. Nozzles 53 are of the convergent-divergent type operating at a relatively high pressure ratio to cause the exit velocity to be supersonic, typically about 1250 meters per second. The number of reaction motors 51 is chosen according to the airflow and power requirements. A typical circumferential speed of reaction motors 51 is about 700 meters per second.

Enclosing the circular orbit along which reaction motors 51 travel is a stationary, substantially toroidal housing 80, sealed from disk 50 by labyrinths 82. Toroidal housing 80 has two functions: to serve as a heat exchanger to preheat the compressed air entering combustion chamber 52 using the heat of the exhaust gases exiting nozzles 53, and to insulate the noise generated in combustion chambers 52. The exhaust gases exit toroidal housing 80 via an exhaust port 84.

Figure 5:
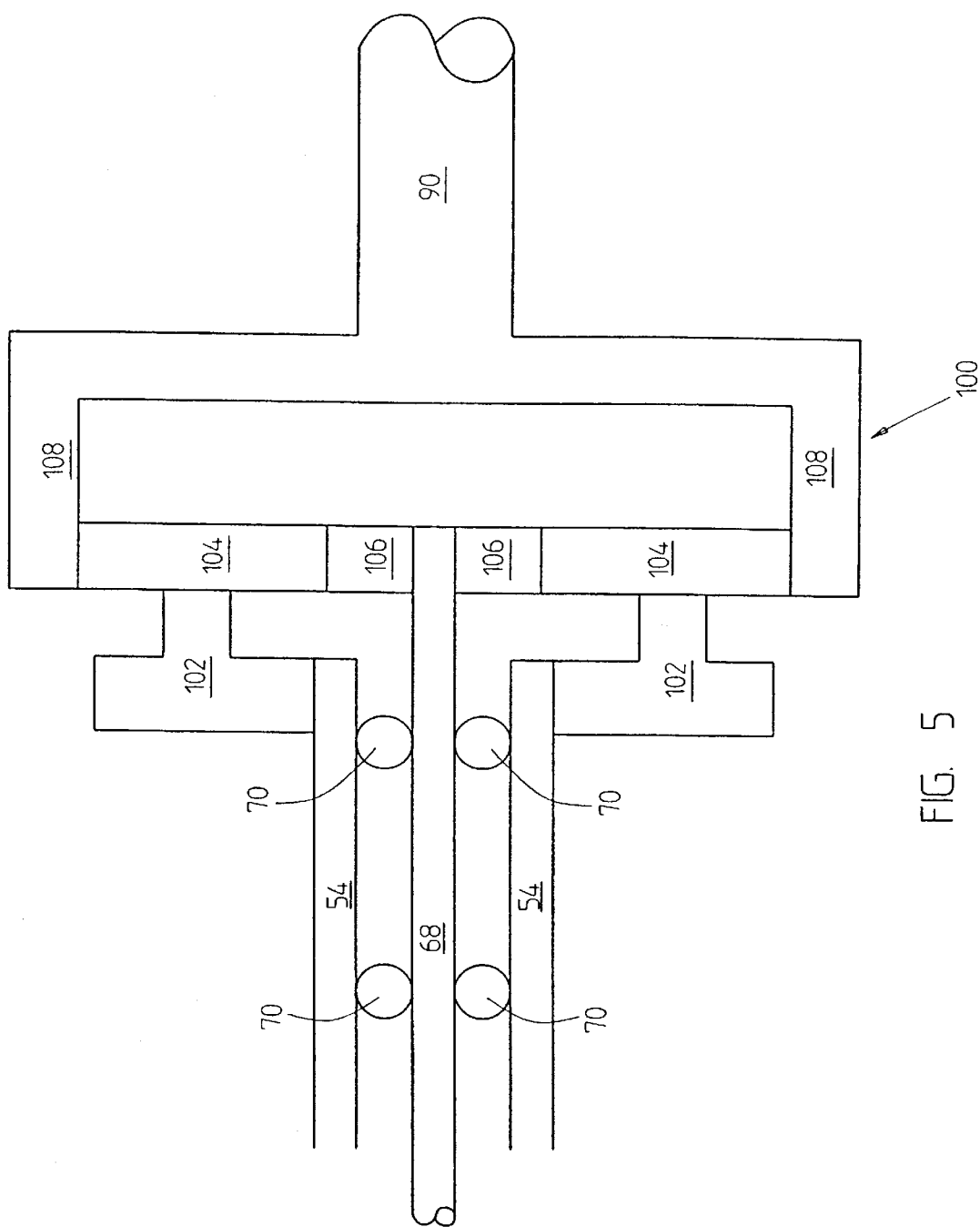
FIG. 5 is a schematic view of the axis of the device of FIG. 3, showing the differential planetary transmission.

FIG. 5 is a schematic diagram of the extension of shafts 54 and 68 past the bottom of FIG. 3, showing how power shaft 54 and compressor shaft 68 are coupled to each other and to a load shaft 90 by a differential planetary transmission 100, so that the torque generated by the exhaust gases expanding through nozzles 53 is used to drive both compressor rotor 62 and the load placed on load shaft 90. Power shaft 54 terminates in planetary carrier 102, to which are attached planetary gears 104. Compressor shaft 68 terminates in sun gear 106. Load shaft 90 terminates in ring gear 108. Together, sun gear 106, planetary gears 104 and ring gear 108 constitute differential planetary transmission 100. Power shaft 54 drives compressor rotor 62 through planetary gears 104, sun gear 106 and compressor shaft 68. Power shaft 54 drives the load placed on the invention through planetary gears 104, ring gear 108 and load shaft 90. This transmission is illustrative: power shaft 54 may be coupled to compressor shaft 68 and load shaft 90 using one of many other transmissions well-known in the art, although differential planetary transmission 100 is the most compact transmission.

Figure 6:
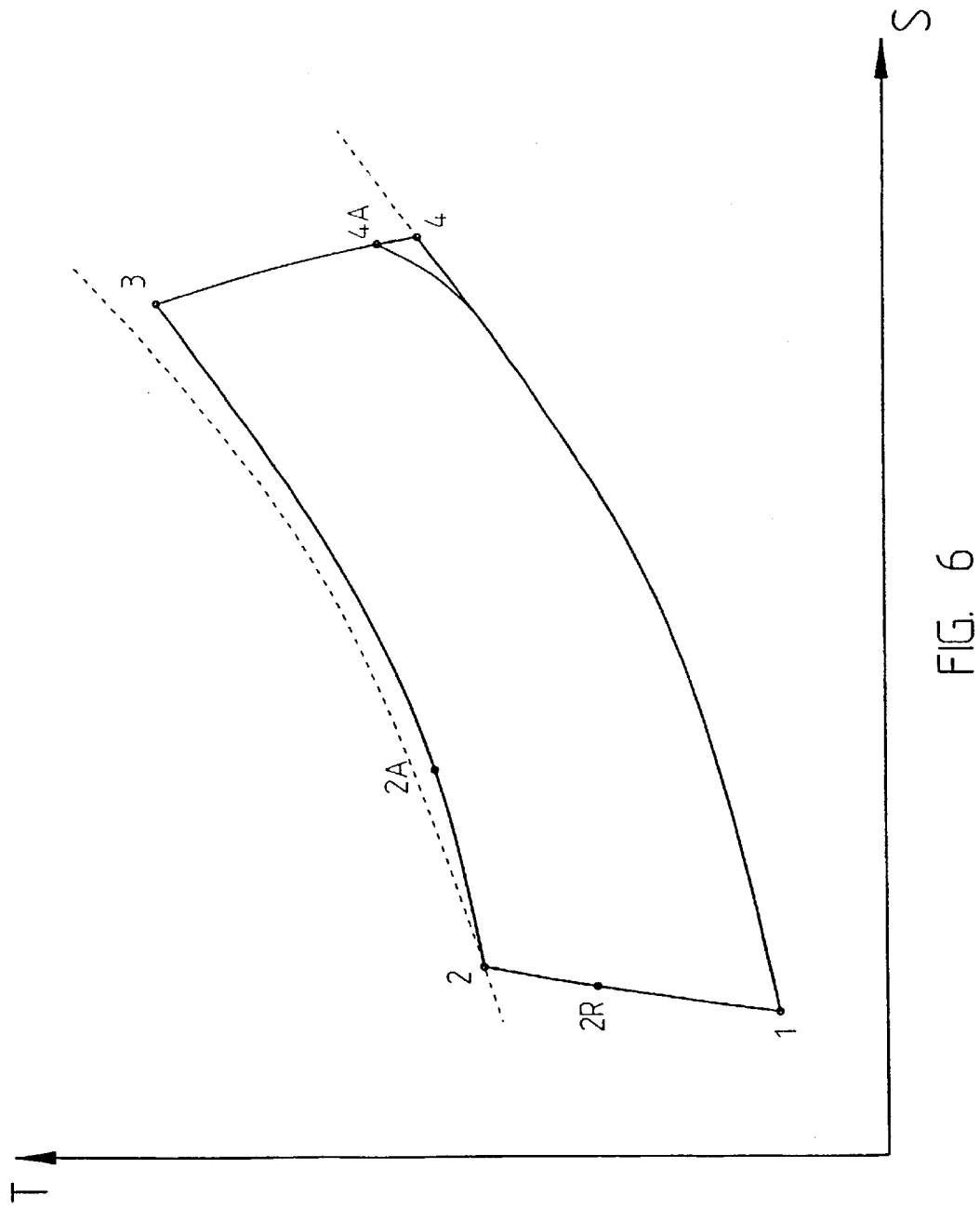
FIG. 6 is a diagram of the thermodynamic cycle of the present invention.

FIG. 6 is a diagram of the thermodynamic cycle of the preferred embodiment of FIG. 3. The abscissa of FIG. 6 is entropy S, and the ordinate is temperature T. The dashed lines are isobars. From point 1 to point 2, air at ambient pressure and temperature is compressed and heated by compressor rotor 62 and diffuser 64, and enters combustion chambers 52 via vanes 66 and slits 58. From point 2 to point 3, air and fuel are burned in combustion chambers 52, creating a hot exhaust gas. From point 3 to point 4, the exhaust gas expands through nozzles 53 to near ambient pressure. From point 4 to point 1, the exhaust gas cools down to ambient temperature.

Assuming matched nozzle expansion conditions, the gross power output from the engine, per unit mass flow (energy per unit mass per unit time) is:

$$E_{gross} = W_e V \quad (1)$$

where $W_e$ is the nozzle exit velocity and V is the peripheral engine speed. $W_e$ is given by:

$$W_e = \sqrt{2\eta_n C_p T_c \left(1 - \frac{1}{\delta_r^{\frac{\gamma-1}{\gamma}}}\right)} \quad (2)$$

where $\eta_n$ is the nozzle adiabatic efficiency, $T_c$ is the combustion exit stagnation temperature (the temperature at point 3 of FIG. 6), $\delta_r$ is the combustor pressure ratio, $C_p$ is the specific heat at constant pressure of the exhaust gas, $C_v$ is the specific heat at constant volume of the exhaust gas and $\gamma$ is $C_p/C_v$. The energy $E_c$ required to compress the air is taken from the total output of the engine $E_{gross}$.

$$E_c = C_{p12} \frac{(T_2 - T_1)}{\eta_m} = \frac{C_{p12}}{\eta_m \eta_c} \left[\delta^{\frac{\gamma-1}{\gamma}} - 1\right] \quad (3)$$

where $\delta$ is the total pressure ratio of compressor rotor 62, $\delta_m$ is the compressor mechanical efficiency, $\eta_c$ is the compressor adiabatic efficiency, and $C_{p12}$ is the specific heat of air at constant pressure going from point 1 to point 2 on FIG. 6. Strictly speaking $C_{p12}$ is a function of temperature; but for the purpose of estimating the efficiency of the embodiment of FIG. 3, $C_{p12}$ can be approximated as a constant. Thus, the net output power per unit mass is:

$$E_{net} = W_e V - C_{p12} \frac{(T_2 - T_1)}{\eta_m} \qquad (4)$$

and the thermal efficiency of the embodiment of FIG. 3 is:

$$\eta_{th} = \frac{E_{net\_output}}{E_{input}} = \frac{W_e V - C_{p12}(T_2 - T_1)/\eta_m}{C_{p23}(T_c - T_{2R})/\eta_{com}} \qquad (5)$$

where $T_{2R}$ is the total rotor exit temperature (relative to the rotor), $C_{p23}$ is the specific heat of combustion air at constant pressure going from point 2 to point 3 on FIG. 6, and $\eta_{com}$ is the combustor efficiency.

When recuperation of the exhaust gas heat is applied using a heat exchanger, then the temperature immediately prior to combustion increases from $T_2$ to $T_{2A}$, and the exhaust temperature increases to $T_{4A}$. Consequently, the new exit velocity is reduced to $W_{eA}$ and the new thermal efficiency is:

$$\eta_{th} = \frac{W_{eA} V - C_{p12}(T_2 - T_1)/\eta_m}{C_{p2A3}(T_c - T_{2R})/\eta_{com}} \qquad (6)$$

Assuming the following parameter values:
$T_1 = 300°$ K.
compressor pressure ratio $\delta_r = 15:1$
compressor adiabatic efficiency $\eta_c = 0.88$
compressor mechanical efficiency $\eta_m = 0.98$
combustor efficiency=0.96
nozzle efficiency $\eta_n = 0.95$
$T_3 = 1773°$ K.
heat exchange efficiency=0.5
orbiting speed V=700 m/sec
the following estimates were obtained:
Net Output:
For a non-recuperated cycle: 226 kW/kg/sec
For a recuperated cycle: 221 kW/kg/sec
Thermal Efficiency:
For a non-recuperate cycle: $\eta_{th} = 26.0\%$
For a recuperated cycle: $\eta_{th} = 35.0\%$ A competitive gas turbine engine working with the same cycle pressure ratio and the same $T_3$ delivers only 163 kW/kg/sec with a thermal efficiency of only 23.2%.

While the invention has been described with respect to a limited number of embodiments, it will be appreciated that many variations, modifications and other applications of the invention may be made.

What is claimed is:

1. An engine for driving a load shaft, comprising:
   (a) a power shaft; and
   (b) a plurality of combustion chambers, each of said chambers being substantially equidistant from said power shaft and rigidly connected to said power shaft, each of said chambers being provided with a nozzle oriented so that exhaust gases exit said chamber therethrough in a direction substantially tangential to a circle concentric with said power shaft;
   (c) an oxidizer supply mechanism for supplying oxidizer laterally to said chambers, said oxidizer supply mechanism including:
      (i) a compressor rotor, substantially coaxial with said power shaft;
      (ii) a diffuser, substantially coaxial with said power shaft and deployed between said compressor and said chambers; and
      (iii) a plurality of vanes, peripheral to said diffuser, wherethrough compressed air is introduced to said chambers; and
   (d) a fuel supply mechanism for supplying fuel to said chambers.

2. The engine of claim 1, wherein said rigid connection of said chambers to said shaft is provided by a disc substantially coaxial with said power shaft.

3. The engine of claim 1, wherein said fuel supply mechanism includes a fuel injector in each of said chambers.

4. The engine of claim 1, further comprising a transmission mechanism for transferring power from said power shaft to the load shaft and to said compressor.

5. The engine of claim 4, wherein said transmission mechanism includes a differential planetary transmission.

* * * * *